United States Patent [19]

Tabata

[11] Patent Number: 5,029,326
[45] Date of Patent: Jul. 2, 1991

[54] PICTURE DISPLAY SYSTEM

[75] Inventor: Toshio Tabata, Tokyo, Japan

[73] Assignee: Pioneer Electronic Corporation, Tokyo, Japan

[21] Appl. No.: 472,543

[22] Filed: Jan. 30, 1990

[30] Foreign Application Priority Data

Aug. 8, 1989 [JP] Japan .................................. 1-203784
Sep. 20, 1989 [JP] Japan .................................. 1-242278

[51] Int. Cl.⁵ .............................................. H04N 7/01
[52] U.S. Cl. ...................................... 358/140; 358/12
[58] Field of Search ...................... 358/140, 11, 12, 13

[56] References Cited

U.S. PATENT DOCUMENTS 4,651,208 3/1987 Rhodes ................................. 358/140
4,931,855 6/1990 Salvadorini ............................ 358/12

Primary Examiner—Howard W. Britton
Attorney, Agent, or Firm—Sughrue, Mion, Zinn, Macpeak & Seas

[57] ABSTRACT

A picture display system in which a picture in the high definition television system is converted into a picture in the conventional television system is provided. The picture display system samples a desired part of picture in the high definition television system, converting a high definition video signal which forms the sampled desired part of the picture into a conventional video signal in the conventional television system, and displays the conventional video signal. The picture in the high definition television system may be divided into a plurality of desired parts, each of which is converted into a conventional television signal. Each of the plurality of desired parts is subsequently displayed on conventional televisions which are arranged to form a single large picture as a whole.

11 Claims, 7 Drawing Sheets

PICTURE DISPLAY SYSTEM

BACKGROUND OF THE INVENTION PICTURE DISPLAY SYSTEM

1. Field of the Invention

The present invention relates to a picture display system which converts a video signal in the high definition television system (HDTV) into a video signal in a conventional television system to display the converted video signal on the screen of the conventional television system. More particularly, the present invention relates to a system in which part of a picture of the high definition television system is sampled to be displayed on the conventional television screen without "thinning out" the number of scanning lines in the high definition television picture.

2. Prior Art

A high definition television system, for example, has been proposed as a new television system that can replace the conventional television system not only for improved picture quality and sound quality, but also for visual and psychological effects such as presence and impression. Hi-Vision is one such high definition television system and the MUSE system has been proposed as a transmission system for the Hi-Vision system.

The MUSE system differs from the conventional television systems such as the NTSC system in the picture system, scanning system and sound system. Therefore, the MUSE signal cannot be directly displayed on the TV screen of the conventional television system. A MUSE-to-NTSC converter (called a down converter) has been proposed for overcoming the differences in the number of scanning lines, aspect ratio, and line frequency to convert the MUSE signal into the NTSC signal for a suitable display.

FIG. 4 illustrates the conversion of output of the down converter into the NTSC picture. The active scanning lines per frame of 1032 in the MUSE signal is reduced to one-third thereof, i.e., 344 by picking up one line for every three lines to thereby convert the high definition picture into the NTSC picture with the aspect ratio of 16:9 in the MUSE system being unchanged. The number of samples in each of the scanning lines is also reduced from 374 samples in the HDTV system to 132 samples in the NTSC system. In this system, since the aspect ratio of the NTSC picture is 4:3 (i.e., 16:12), an area of about 30% including the upper and lower portions of the NTSC picture will be left unused though the horizontal dimension of the picture will remain the same as that of the MUSE system. Each of the 344 scanning lines is displayed with the same scanning density as in the NTSC system which is less than the scanning density in the MUSE system. Thus, this prior art system suffers from a drawback that because the number of scanning lines is reduced from 1032 to 344, the picture displayed on the screen of the NTSC system no longer has the advantage of being high definition, in fact, the picture quality is less than that in the NTSC system.

Japanese Patent Application No. 63-92987 discloses a system in which the high quality picture can be displayed on the conventional television receiver with the high grade of definition in the high definition television picture being unimpaired. In this prior art system, the Hi-Vision picture is divided into a plurality of pictures, each of which is converted into the NTSC signal to form a single picture as a whole which can be displayed using a plurality of NTSC receivers. While the system is capable of displaying a picture having a high degree of definition with practically sufficient brightness on the conventional NTSC receiver by using a projection unit for multi-display purpose, complex signal processing is necessary to convert the scanning lines from Hi-Vision to NTSC. As shown in FIG. 5, the Hi-Vision picture is divided into three sections vertically and into four sections horizontally. Each of the 12 pictures is displayed on an NTSC receiver and the 12 pictures are properly arranged to form a single large display as a whole. The NTSC system is based on 525 horizontal scanning lines. Thus, the 1575 (=525 times 3) horizontal scanning lines are required to display the vertical portion using three NTSC televisions. Since the Hi-Vision is based on 1125 scanning lines, a scanning line conversion process is required where seven horizontal scanning lines are extracted from every five horizontal scanning lines. This conversion process necessitates the complexity of circuit design which leads to a large and expensive apparatus.

SUMMARY OF THE INVENTION

An object of the present invention is to provide a picture display system capable of displaying a picture with as high quality as possible when the high definition television signal is to be displayed by converting into the conventional television signal. The high definition television picture has an aspect ratio of 16:9. In the present invention, a desired part of the high definition television picture which is to be displayed with the ordinary television receiver is first determined with the same aspect ratio as the original high definition television picture. Then, scanning lines that form the desired part of the high definition television picture are taken out from the high definition television signal. Thereafter, a signal having the same number of successive samples in the horizontal direction as the convetional television signal is taken out from each of the sampled scanning lines. In this manner, the high quality picture in the high definition television system can also be displayed with the conventional television receiver. In addition, good picture quality is obtained as in the conventional television system.

Another object of the invention is to provide a divisional television picture display system capable of displaying the picture having high definition when the high definition television picture is to be displayed by dividing into a plurality of pictures, each of which is converted into the conventional television signal and the plurality of pictures are subsequently displayed on the conventional televisions arranged to form a single large picture as a whole.

BRIEF DESCRIPTION OF THE DRAWINGS

Features and other objects of the present invention will be more apparent from the description of preferred embodiments with reference to the accompanying drawings in which.

DESCRIPTION OF THE PREFERRED EMBODIMENTS

Operation

The high definition television picture has an aspect ratio of 16:9. A desired part of a high definition television picture, which is to be displayed with the conventional television receiver, is first determined. The desired part is specified to have the same aspect ratio as the original high definition television picture. Then, the scanning lines that form the desired part of the high definition television picture are taken out from the high definition television signal. Thereafter, a signal with the same number of successive samples in the horizontal direction as in the conventional television signal is taken out from each of the scanning lines which have been thus taken out. In this manner, the picture of the high definition television can be displayed with the conventional television receiver with as good picture quality as in the conventional television system.

The picture in the high definition television system may be divided into a plurality of desired parts each of which is displayed on each of screens of the conventional television system to form the entire picture, thereby displaying the picture of the high definition television system using the conventional television system.

First embodiment

Figure 1:
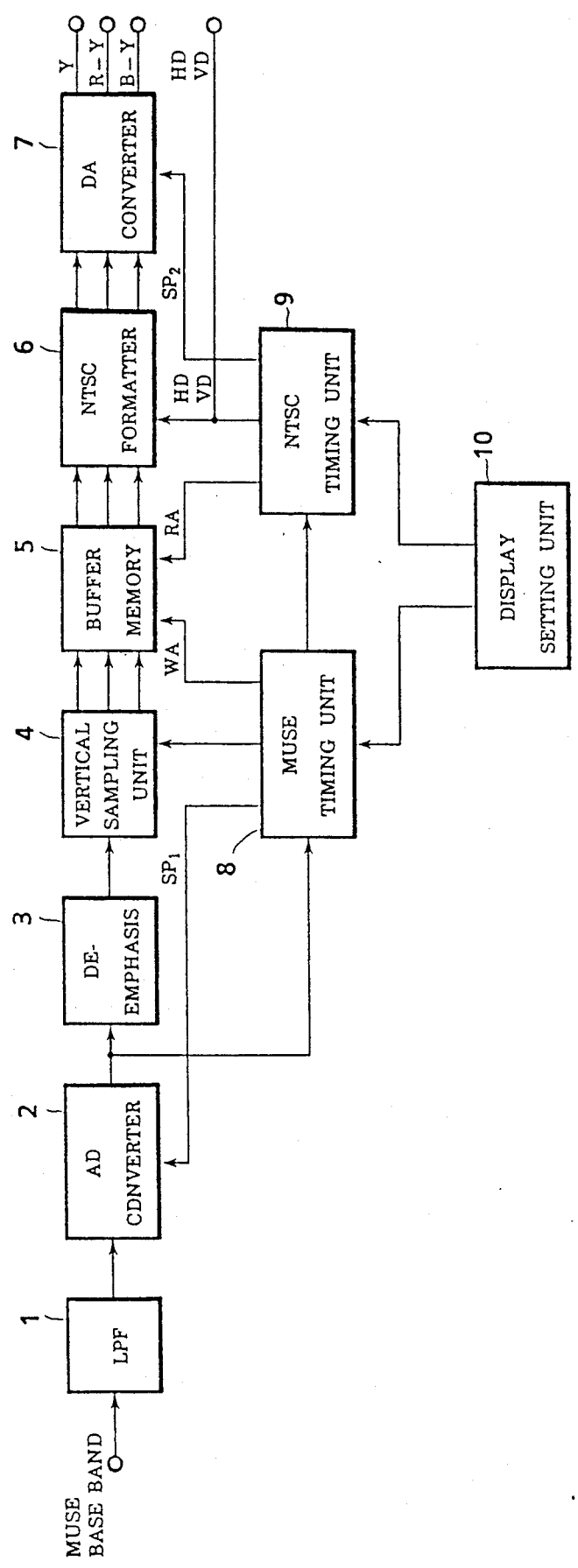
FIG. 1 is a block diagram showing a first embodiment of a picture display system according to the present invention.

FIG. 1 is a block diagram for showing a first embodiment of a picture display system according to the present invention where the MUSE signal, one of the Hi-Vision signals, is converted into the NTSC signal.

In FIG. 1, the MUSE base band signal that is received through a BS antenna and outputted from a BS tuner is supplied to a low-pass filter 1 having a cut-off frequency of 8.15 MHz, and is then converted into a digital signal by an A/D converter 2 having a sampling frequency of 16.2 MHz, which is the same as that of the re-sampling signal in the MUSE system.

The MUSE signal converted into the digital signal is subjected to de-emphasis process by a de-emphasis circuit 3, and thereafter is supplied to a vertical sampling unit which in turn performs a scanning-line reduction process in which the active scanning lines of 1032 per frame are reduced to one-third thereof by picking up one line for every three lines of the scanning lines in the MUSE signal. In the alternative, scanning-line sampling process is performed in which successive 480 lines (as many lines as the active scanning lines per frame in the NTSC system) in an arbitrary part of the high definition picture are sampled from the active scanning lines of 1032 per frame. The scanning-line reduction process is performed when the system selects the entire-picture displaying mode in which the entire picture of MUSE is displayed with the NTSC TV screen, whereas the scanning-line sampling process is performed when the system selects the sampled-picture displaying mode in which part of the MUSE picture is sampled and displayed with the NTSC TV screen. The de-emphasis circuit 3 then supplies a buffer memory 5 with the luminance signal Y, the color difference signals R-Y and B-Y, of thus taken out or sampled respective lines.

The buffer memory 5 is a memory for successively storing the luminance signal and the color difference signals enough for one field, and has a memory capacity sufficient for handling the difference in time between the MUSE signal and NTSC signal since the timing in writing and reading signals is different for the MUSE signal and the NTSC signal. The input signal is written at the memory address specified by a write-address signal WA. The signal thus written is read out from the memory address specified by a read-address signal RA. The signal that is read out from the buffer memory 5 is synchronized with a horizontal sync signal HD and a vertical sync signal VD by an NTSC formatter 6 so that the signal is converted into the video signal of the NTSC system, and is then converted into an analog signal by a D/A converter 7.

The MUSE signal converted into a digital signal by the A/D converter 2 is supplied to a MUSE timing unit 8 which detects the horizontal sync signal and the vertical sync signal from the MUSE signal to produce various timing signals. These timing signals are then supplied to the A/D converter 2, the vertical sampling unit 4, the buffer memory 5, and the later described NTSC timing unit 9.

The horizontal sync signal is inserted from the first sampling point to the eleventh sampling point of each scanning line with the polarity of the sync signal being reversed for each and the next line in the MUSE base band signal. A re-sampling signal SP1 of 16.2 MHz is produced from the horizontal sync signal. A frame pulse is inserted using two lines in every frame of the MUSE base band signal and the waveforms of the two lines are reversed in polarity relative to each other. Therefore, the frame pulse (vertical sync signal) can easily be distinguished from the video signal, ensuring the detection of the frame pulse.

The NTSC timing unit 9 produces the various timing signals on the basis of the sync signal detected and the timing signal produced by the MUSE timing unit 8 to feed the read-address signal RA to the buffer memory 5, the horizontal and vertical sync signals HD and VD to the NTSC formatter 6, and the sampling signal SP2 to the D/A converter 7.

The display setting unit 10 selects either the entire-picture displaying mode or the sampled-picture displaying mode, and outputs a signal indicative of the mode selected as well as a signal representative of the sampling position in the high definition television picture to both the MUSE timing unit 8 and the NTSC timing unit 9 when the sampled-picture displaying mode is selected. These timing units 8 and 9 control the vertical sampling unit 4 and the buffer memory 5 on the basis of these signals. The scanning reduction process previously described is performed in the entire-picture displaying mode, and the scanning line sampling process is performed in the sampled-picture displaying mode.

Figure 2:
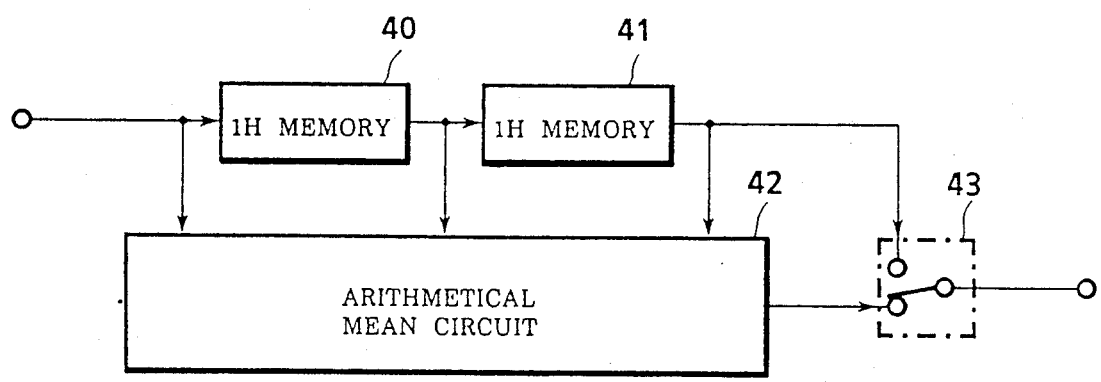
FIG. 2 is a block diagram for illustrating the essential part of a vertical sampling unit in FIG. 1.

The essential part of the vertical sampling unit 4 is shown in FIG. 2 in which a circuit for processing the luminance signal Y is shown as an example. The circuit includes a first 1H memory 40 and a second 1H memory 41, an arithmetical mean circuit 42, and a selection circuit 43. Each of the first and second 1H memories causes the luminance signal Y of the MUSE signal to delay by one line (H). The arithmetical mean circuit 42 calculates an arithmetical means of successive three lines, i.e., the input signal to the arithmetical means circuit 42, the outputs from the 1H memories 40 and 41. The selection circuit 43 selectively receives the output of the 1H memory 41 and the output of the arithmetical mean circuit 42.

With the construction described above, when the entire-picture displaying mode is selected by the display setting unit 10, the MUSE signal inputted to the vertical sampling unit 4 is subjected to the "three-line-to-one-line" conversion by the arithmetical mean circuit 42 to produce 344 lines from the 1032 active scanning lines per frame of the high definition picture. The lines thus produced are written into the buffer memory 5 via the selection circuit 43. The MUSE signal thus written into the buffer 5 is read out as the NTSC signal, the number of samples 374 in horizontal lines remaining the same as that in MUSE.

When the sampled-picture displaying mode is selected by the display setting unit 10, the MUSE signal inputted to the vertical sampling unit 4 is delayed by the 1H memories 40 and 41 and is then written into the buffer memory 5 via the selection circuit 43. The 1H memories 40 and 41 sample the successive 480 lines that form the desired part of the picture specified by the display setting unit 10. The successive 132 samples of the 374 samples in each of 480 scanning lines of the desired part of the MUSE picture are written into the buffer memory 5. The signal which is read out from the buffer memory 5 is converted into a signal in synchronism with the horizontal and vertical sync signals HD and VD, and is then converted into an analog signal by the D/A converter 7 to subsequently be outputted to an NTSC receiver not shown.

Figure 3:
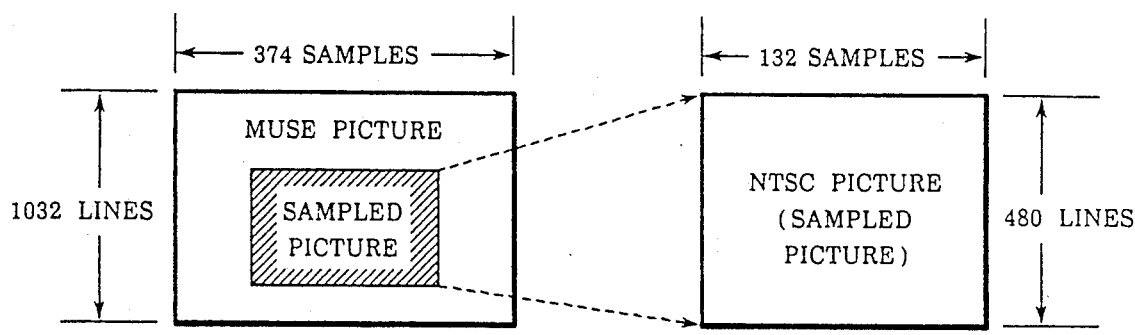
FIG. 3 illustrates how the scanning lines are sampled from the MUSE system picture to form the NTSC system picture.
Figure 4:
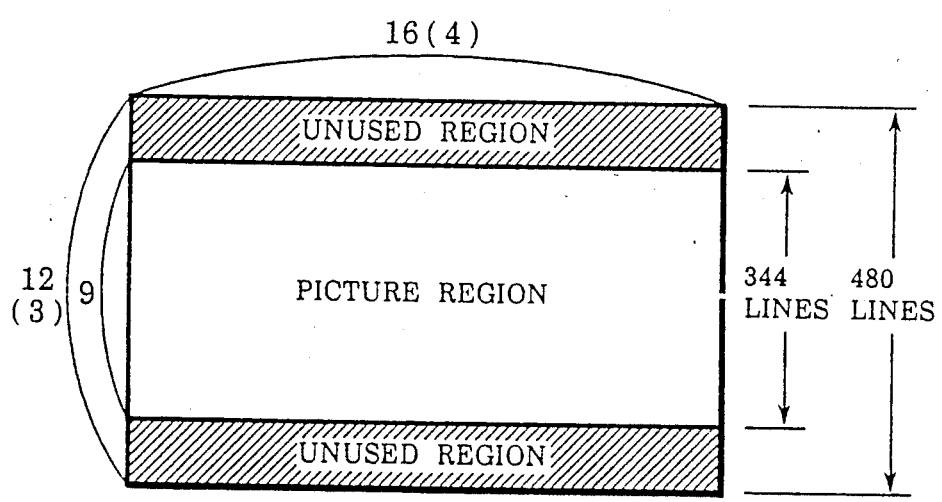
FIG. 4 is a picture that is outputted from a down converter.
Figure 5:
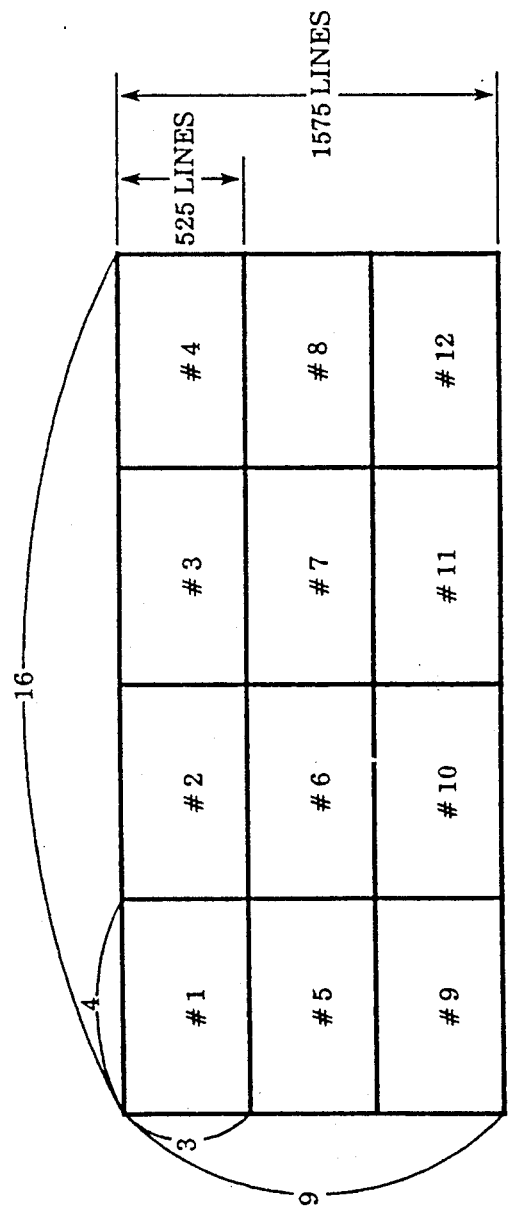
FIG. 5 shows a prior art picture display system.

The entire-picture displaying mode is first selected for displaying the entire picture of MUSE on the NTSC picture to determine which part of the entire picture of MUSE is to be sampled. Then the sampled-picture displaying mode is selected so that the desired part is actually sampled from the MUSE signal. In this manner, as shown in FIG. 3, the desired part of the MUSE picture is displayed with as good quality as in the NTSC receiver. The picture quality thus obtained is clearly improved as compared to that of the prior art shown in FIG. 4.

The vertical sampling unit need not be of a three-tap configuration using two 1H memories but may also be arranged, for example, in five-taps or seven-taps.

An interpolation process may be applied to the MUSE signal so that the MUSE signal before sub-sampling is retrieved from the MUSE signal which has been subjected to the sub-sampling process. In which case, an additional arithmetical mean circuit may be used in place of the selection circuit 43, or an interpolation circuit may be added.

Second embodiment

Figure 6:
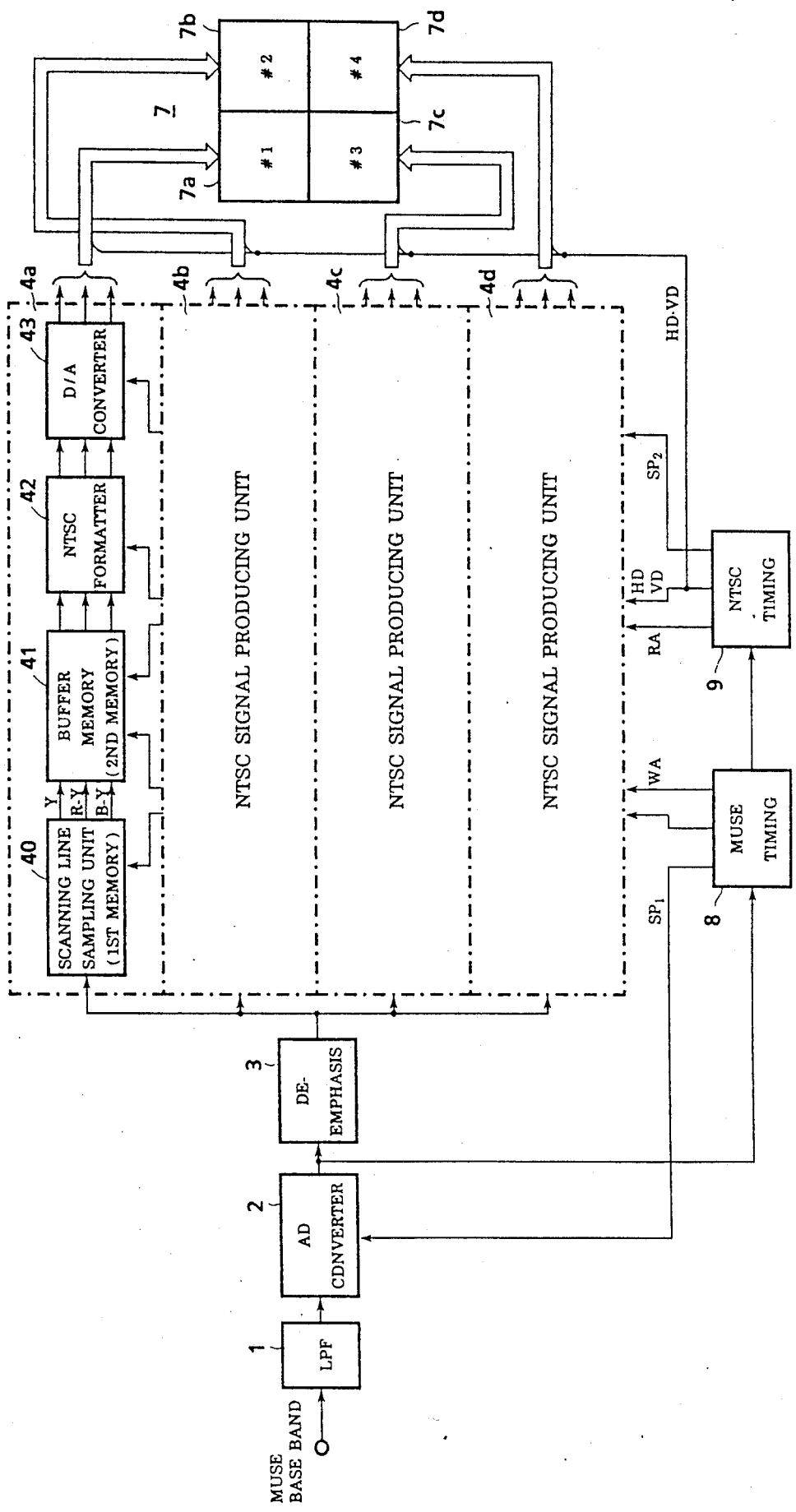
FIG. 6 is a block diagram for showing a second embodiment of a picture display system according to the present invention.

FIG. 6 is a block diagram for showing a second embodiment of a picture display system according to the present invention where the MUSE signal, one of the Hi-Vision signals, is converted into the NTSC signal.

In FIG. 6, the MUSE base band signal that is received through the BS antenna and outputted from the BS tuner is supplied to the low-pass filter 1 having a cut-off frequency of 8.15 MHz, and is then converted into a digital signal by the A/D converter 2 having a sampling frequency of 16.2 MHz, which is the same as that of the re-sampling signal in the MUSE system.

The MUSE signal converted into the digital signal is subjected to de-emphasis process by the de-emphasis circuit 3, and thereafter is supplied to a first through fourth signal producing units 4a–4d of the same construction. These signal producing unit 4a–4d are each formed of a scanning line sampling unit 40, a buffer memory 41, an NTSC formatter 42, and a D/A converter 43.

Figure 7:
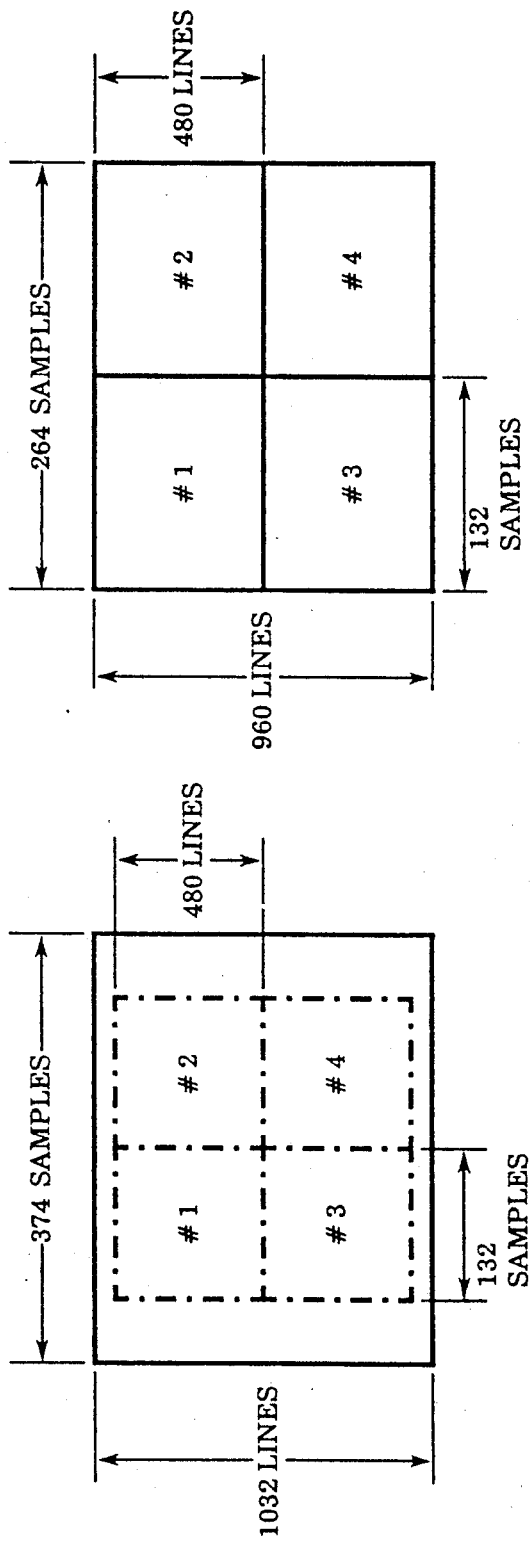
FIG. 7A shows a MUSE picture.
FIG. 7B shows an NTSC picture formed of four NTSC television receivers.

As shown in FIGS. 7A and 7B, the scanning lines sampling unit 40 extracts the successive 480 lines (as many lines as there are the active scanning lines per frame in the NTSC system) out of 1032 effective scanning lines of the MUSE signal to interpolate the sub-sampling specific to the MUSE signal, and then supplies a buffer memory 41 with the luminance signal Y, the color difference signals R-Y and B-Y, Y, of thus taken out or sampled respective lines.

The buffer memory 41 is a memory for successively storing the luminance signals and the color difference signals enough for 132 successive samples as shown in FIG. 7B which are interpolated in the horizontal direction, and has a memory capacity sufficient for handling the difference in time between the MUSE signal and NTSC signal since the timing in writing and reading signals is different for the MUSE signal and the NTSC signal. The input signal is written into the memory address specified by a write-address signal WA. The signal thus written is read out from the memory address specified by a read-address signal RA. The signal that is read out from the buffer memory 41 is synchronized with a horizontal sync signal HD and a vertical sync signal VD by an NTSC formatter 42 so that the signal is converted into the video signal of the NTSC system, and is then converted into an analog signal by the D/A converter 43. The outputs of the NTSC signal producing units 4a–4d are inputted into NTSC receivers 7a–7d.

The MUSE signal converted into a digital signal by the A/D converter 2 is supplied to a MUSE timing unit 8 which detects the horizontal sync signal and the vertical sync signal from the MUSE signal inputted to produce various timing signals, which in turn are supplied to the A/D converter 2, the scanning sampling unit 4, the buffer memory 41, and the later described NTSC timing unit 9.

The horizontal sync signal is inserted from the first sampling point to the eleventh sampling point of each scanning line with the polarity of the sync signal being reversed for each and the next scanning line in the MUSE base band signal. From the horizontal sync signal is produced a re-sampling signal SP1 of 16.2 MHz. A frame pulse is inserted using two lines in every frame of the MUSE base band signal and the waveforms of the two lines are reversed in polarity relative to each other. Therefore the frame pulse (vertical sync signal) can easily be distinguished from the video signal, ensuring the detection of the frame pulse.

The NTSC timing unit 9 produces the various timing signals on the basis of the sync signal detected and the timing signal produced by the MUSE timing unit 8 to feed the read-address signal RA to the respective buffer memories 41 of the NTSC signal producing units 4a–4d, the horizontal and vertical sync signals HD and VD to the NTSC formatter 42, and the sampling signal SP2 to the D/A converter 43.

In this manner, the scanning signals that form MUSE pictures #1 to #4 (FIG. 7A) are extracted and are then supplied to the NTSC receivers 7a-7d so as to be displayed as NTSC pictures #1-#4 (FIG. 7B).

In the NTSC signal producing unit 4a, successive 480 scanning lines that form the picture #1 on the left top of the MUSE picture is extracted from the MUSE signal by the scanning line sampling unit 40, the extracted scanning lines are interpolated for 132 samples that form the picture #1 out of 374 samples in the horizontal direction of the scanning signal, and thereafter the 132 samples are written into the buffer memory 41. The signal written into the buffer memory 41 is read out by the address signal RA which is supplied from the NTSC timing unit 9 so as to be converted by the NTSC formatter 42 into a signal which is in synchronism with the horizontal and vertical sync signals HD and VD. The output of the D/A converter 43 is then converted into the NTSC receiver 7a.

Similarly, the other NTSC signal producing units 4b-4d extract the scanning lines that form the pictures #2 to #4 from the MUSE signal for converting into the NTSC signal to output them to the NTSC receivers 7b-7d.

Thus, as shown in FIG. 7A, the MUSE picture having 1032 effective scanning lines, 374 horizontal samples is divided into the four pictures #1-#4 each of which has the 480 effective scanning lines and 132 horizontal samples. Each of the four pictures is converted into the NTSC signal to be displayed on each of the NTSC television screens. By this arrangement, the MUSE picture having 960 effective scanning lines and 264 horizontal samples is displayed as a high definition picture on the displayer 7.

Figure 8:
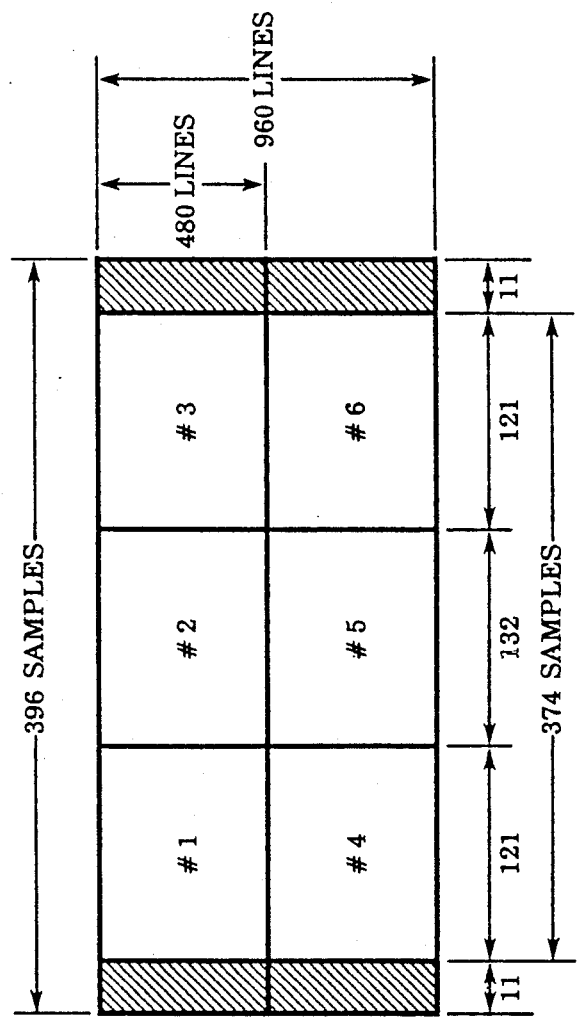
FIG. 8 shows the NTSC picture formed of six NTSC television receivers, three receivers horizontally and two receivers vertically.

As shown in FIG. 8, the MUSE picture may be divided into three sections horizontally and into two sections vertically, i.e., six pictures #1-#6. In which case, the total number of pixels is 396 (=132 times 3) which is more than 374 horizontal pixels of the MUSE picture. Therefore, there will be eleven unused pixels on the left and right ends of the NTSC picture, which can be set as the black level for preventing uncomfortable TV watching.

What is claimed is:

1. A picture display system in which a picture in a high definition television system is converted into a picture in a conventional television system, comprising steps of:
    sampling at least one desired part of a picture in the high definition television system, said desired part having as many contiguous scanning lines as there are in the conventional television system, and each of the contiguous scanning lines having as many contiguous samples as there are in the conventional television system;
    converting said desired part of a picture into a conventional video signal in the conventional television system; and
    displaying said desired part converted into the conventional video signal on a screen of the conventional television system.

2. A picture display system in which a picture in a high definition television system is converted into a picture in a conventional television system, comprising steps of:
    a first display system in which the number of scanning lines of a video signal in the high definition television system is reduced to display an entire picture of the high definition television system on a screen of the conventional television system; and
    a second display system in which part of a picture in the high definition television is sampled without thinning out the number of scanning lines for being displayed on the screen of the conventional television system; wherein
    said first and second systems are selectively performed to display the picture on the screen of the conventional television system.

3. A picture display system in which a picture in a high definition television system is converted into a picture in a conventional television system, comprising steps of:
    sampling at least one desired part of a picture in the high definition television system;
    converting a high definition video signal which forms the sampled desired part of said picture into a conventional video signal in the conventional television system; and
    displaying said conventional video signal on a screen of the conventional television system, wherein said picture in the high definition television system is divided into a plurality of desired parts each of which is converted into a conventional television signal, each of the plurality of desired parts being subsequently displayed on each of conventional televisions which are arranged to form a single large picture as a whole.

4. A picture display system in which a picture in a high definition television system is converted into a picture in a conventional television system, comprising steps of:
    sampling at least one desired part of a picture in the high definition television system;
    converting a high definition video signal which forms the sampled desired part of said picture into a conventional video signal in the conventional television system; and
    displaying said conventional video signal on a screen of the conventional television system, wherein said converting step comprises taking out scanning lines from said at least one desired part and forming a signal with the same number of successive samples in the horizontal direction as in the conventional television signal from said scanning lines.

5. A picture display system in which a picture in a high definition television system is converted into a picture in a conventional television system, said picture display system comprising:
    antenna means for receiving a high definition television signal;
    filter means for filtering said thus-received high definition television signal;
    A/D converter means for converting said high definition television signal into a digital signal;
    de-emphasis processing means for de-emphasizing said digital signal;
    vertical sampling means for performing one of scanning-line reduction processing and scanning-line sampling processing;
    memory means for storing luminance and color difference information for one of said reduced and sampled signals;
    formatting means for converting one of said reduced and sampled signals into a digital conventional television system signal; and
    D/A converter means for converting said conventional television system signal into an analog signal.

6. The picture display system of claim 5, further comprising:
   timing means for producing various timing signals; and
   display setting means for selecting one of an entire picture display mode and a sampled-picture displaying mode.

7. The picture display system of claim 6, wherein said vertical sampling means performs scanning-line reduction processing when said display setting means selects said entire-picture displaying mode and said vertical sampling means performs scanning-line sampling processing when said display setting means selects said sampled-picture displaying mode.

8. The picture display system of claim 5, wherein said vertical sampling means comprises at least first and second 1H memories connected in series, an arithmetic mean circuit connected in parallel with said first and second 1H memories, and selection means connected to an output of said first and second 1H memories and to an output of said arithmetic mean circuit.

9. A picture display system in which a picture in a high definition television system is converted into a picture in a conventional television system, said picture display system comprising:
   antenna means for receiving a high definition television signal;
   filter means for filtering said thus-received high definition television signal;
   A/D converter means for converting said high definition television signal into a digital signal;
   de-emphasis processing means for de-emphasizing said digital signal;
   a plurality of signal processing means for extracting scanning lines from said digital signal and converting said extracted scanning lines into conventional television signals; and
   a plurality of conventional television receivers for displaying said conventional television signals.

10. A picture display system as claimed in claim 9, wherein each of said plurality of signal processing means comprises:
    scanning line sampling means for forming a signal by extracting scanning lines from said digital signal;
    buffer memory means for storing luminance and color difference information from said signal;
    formatting means for converting said signal into a digital conventional television system signal; and
    D/A converter means for converting said digital conventional television system signal into an analog signal.

11. A picture display system as claimed in claim 9, further comprising:
    timing means for producing various timing signals for use by said plurality of signal processing means.

* * * * *